UNITED STATES PATENT OFFICE.

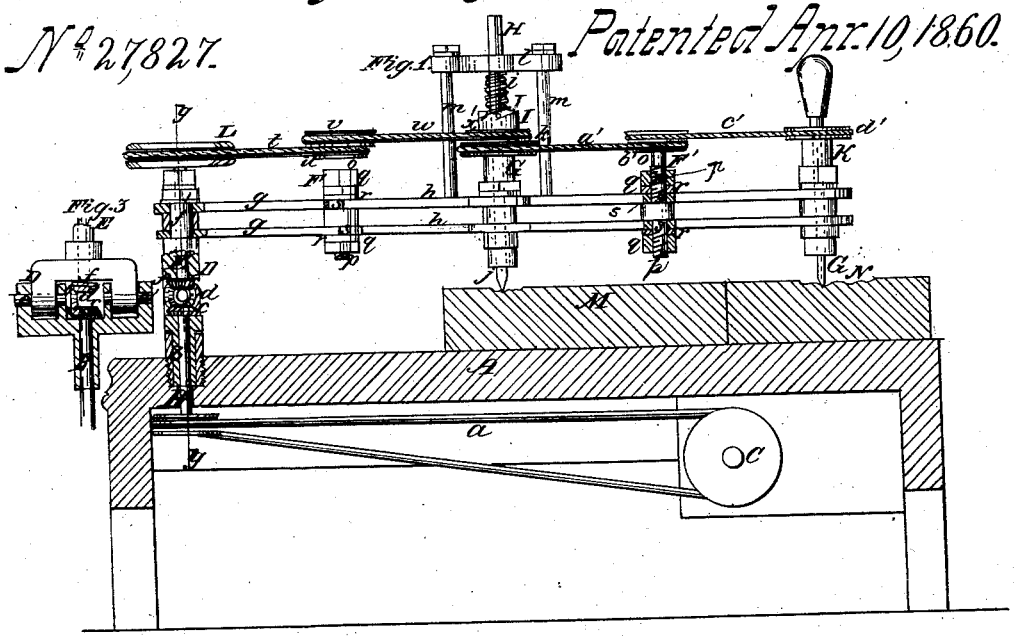
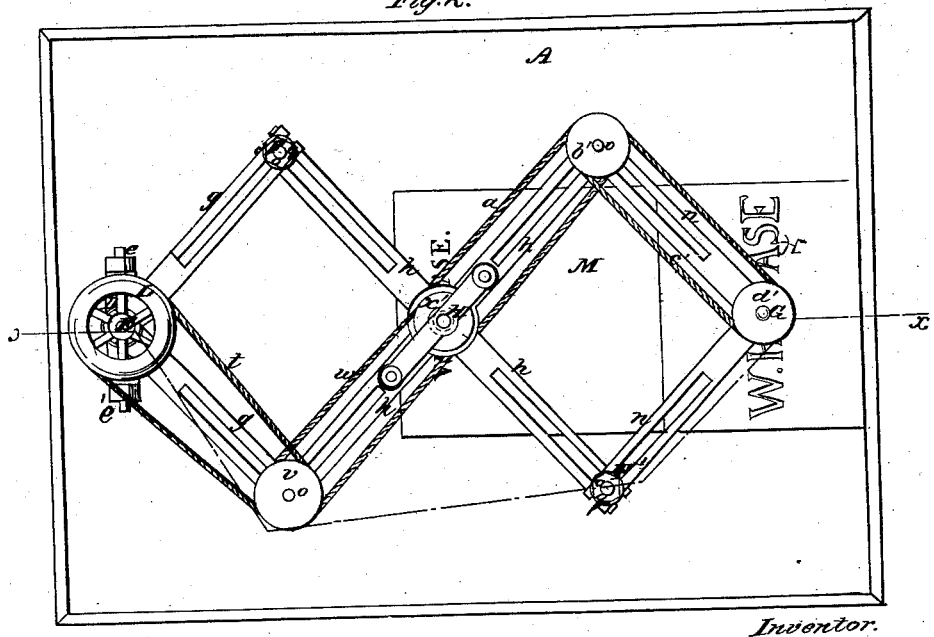

W. H. PEASE, OF GOSHEN, INDIANA.

MACHINE FOR CARVING MARBLE, &c.

Specification of Letters Patent No. 27,827, dated April 10, 1860.

*To all whom it may concern:*

Be it known that I, W. H. PEASE, of Goshen, in the county of Elkhart and State of Indiana, have invented a new and useful Machine for Carving, Lettering, and Performing Similar or Analogous Work in Wood, Metal, or Stone; and I do hereby declare that the following is a full, clear, and exact description of the same, reference being had to the annexed drawings, making a part of this specification, in which—

Figure 1, is a side sectional view of my invention, taken in the line $x, x$, Fig. 2. Fig. 2, a plan or top view of ditto. Fig. 3, a detached sectional view of a portion of ditto taken in the line $y, y$, Fig. 1.

Similar letters of reference indicate corresponding parts in the several figures.

This invention is chiefly designed for operating, from patterns and may be advantageously used for carving, lettering, planing irregular or winding surfaces and the like.

The invention consists in the employment or use of a system of levers, known as the lazy tongs, provided with an index and cutter, and arranged substantially as hereinafter shown and described to effect the desired end.

To enable those skilled in the art to fully understand, and construct my invention I will proceed to describe it.

A, represents a table or platform in which, near one end, a vertical shaft B is placed and rotated from a driving shaft C by means of a belt $a$. The shaft B, is fitted within a suitable bearing $b$ in the table or platform, and it has a bevel wheel $c$ on its upper end, which wheel $c$, gears into a corresponding wheel $d$ on a horizontal shaft $e$ which forms one of the pintles of a joint D, the construction of which is shown clearly in Fig. 3. The other pintle $e'$ of the joint performs no other than its legitimate function of a pintle.

In the upper part of the joint D, a vertical arbor E is placed, said arbor having a wheel $f$ on its lower end, which wheel gears into the wheel $d$ of shaft $e$, a rotary motion is thereby communicated from the shaft B, to the arbor E. On the socket or bearing $f'$, of the arbor E, two levers $g, g$, are fitted or placed loosely. The outer parts of these levers are slotted longitudinally and they are connected to levers $h$ $h$, which have their adjoining ends, also slotted longitudinally, by means of adjustable joints F. The levers $h, h$, are crossed as shown clearly in Fig 2, and they work on a hollow spindle G, through which an arbor H, passes and on which a cam I is placed loosely. Through the arbor H, a pin J, passes horizontally, said pin resting on the cam I and kept thereon by a spiral spring $i$ on the arbor H as shown clearly in Fig. 1. To the lower end of the arbor H, a cutter $j$ is attached, and on the upper part of the hollow spindle G, there is placed a pulley $k$. The upper part of the arbor H has its bearing in a bar $l$ attached to the upper ends of two uprights $m$ $m$ as shown clearly in Fig. 1.

The levers $h$ $h$, are connected at their outer ends to levers $n, n$, by joints F' which are constructed precisely similar to the joints F, and the outer ends of the levers $n$ $n$ are fitted loosely on a hollow spindle K, in which an arbor G' is placed.

The joints F, F', are formed of pintles $o, o$, which pass through hollow screws $p$ $p$, on which nuts $q$ $q$ are fitted the screws $p$ $p$ having washers $r, r$, on them and they each have also parallel smooth sides $s, s$, arranged to fit into the slots of the levers. By adjusting the nuts $q, q$, the parallel sides $s, s$, are firmly secured in the slots of the levers and by relaxing or unscrewing the nuts the joints F, F', may be adjusted so as to virtually increase or decrease the length of the levers.

The system of levers $g, g, h, h, n, n$, form the lazy tongs as shown clearly in Fig. 2.

On the upper part of the arbor E a pulley L is secured, around which a belt $t$ passes, said belt also passing around a pulley $u$ which is placed loosely on the upper part of one of the pintles of one of the joints F. The pulley $u$ has a pulley $v$ attached to it, around which a belt $w$ passes, said belt also passing around a pulley $x'$ on the cam I. The pulley $k$ of the hollow spindle G, has a belt $a'$ passing around it, said belt passing around a pulley $b'$, on a pintle of one of the joints F'. The pulley $b'$ is double-grooved and a belt $c'$ also passes around it, the belt $c'$ also passing around a pulley $d'$ on the arbor G'.

The operation of the machine is as follows: Suppose for instance that it is required to carve letters in a stone slab. The slab M is secured on the table or platform A in any proper way and a pattern N of the letters to be cut also placed on the table beneath the arbor G'. The shaft C is then rotated by any convenient power and the point of the arbor G passed over the letters of the pattern N. The movement of the arbor G', which is a tracer, is communicated to the arbor H through the medium of the levers described. This arbor H, not only has the tracing movement of the arbor G', communicated to it, but it also has given it an up and down movement by the cam I, pin J, and spring i, and these movements combined cause the tool j to cut letters in the stone M, corresponding to those of the pattern but smaller in size. The depth of the cut will also correspond with the original as the joint D, admits of vertical movement of the whole system of levers. In case of carving in wood, and planing, curved or irregular surfaces, where no pecking is required and consequently no up and down motion of the arbor H, the motion of the cam I may be reversed and the latter will rotate the arbor only. By having the rotary motion of arbor H, communicated to arbor G' by belts a' c' and a proper tool fitted in arbor G', the arbor H may be used as a tracer and the pattern being placed under it the tool in arbor G' may perform the work, thereby enlarging from the pattern instead of diminishing from it.

Having thus described my invention what I claim as new and desire to secure by Letters Patent, is:

The levers g, h, n, arranged as shown to form the lazy tongs, provided within the joint D, and the arbors H, G', operated from the driving shaft by means of the gear and belts substantially and for the purposes set forth.

W. H. PEASE.

Witnesses:
E. M. CHAMBERLAIN,
JOHN H. BAKER.